United States Patent
Park et al.

(10) Patent No.: US 10,132,427 B1
(45) Date of Patent: Nov. 20, 2018

(54) MULTI-STIFFENER FOR CIVIL ENGINEERING AND CONSTRUCTION

(71) Applicant: Korea Occupational Safety and Health Agency, Ulsan (KR)

(72) Inventors: Ju Dong Park, Gyeongsangnam-do (KR); Jeong Se Lee, Busan (KR); Hyun Sub Lee, Gyeonggi-do (KR)

(73) Assignee: KOREA OCCUPATIONAL SAFETY AND HEALTH AGENCY, Ulsan (KR)

( * ) Notice: Subject to any disclaimer, the term of this patent is extended or adjusted under 35 U.S.C. 154(b) by 0 days.

(21) Appl. No.: 15/600,430

(22) Filed: May 19, 2017

(51) Int. Cl.
| F16L 1/09 | (2006.01) |
| F16L 27/12 | (2006.01) |
| F16L 25/12 | (2006.01) |
| F16L 21/00 | (2006.01) |
| F16L 3/01 | (2006.01) |
| F16L 1/06 | (2006.01) |

(52) U.S. Cl.
CPC .............. F16L 1/09 (2013.01); F16L 21/005 (2013.01); F16L 25/12 (2013.01); F16L 27/12 (2013.01); *F16L 1/06* (2013.01); *F16L 3/01* (2013.01); *F16L 21/002* (2013.01)

(58) Field of Classification Search
CPC ... F16L 1/06; F16L 1/09; F16L 21/002; F16L 21/005; F16L 27/12; F16L 25/12; F16M 11/00; F16M 11/24; F16M 11/28; Y10T 403/32467; Y10T 403/32475; Y10T 403/32491; Y10T 403/32508
USPC ......... 403/109.1, 109.2, 109.4, 109.6, 109.8; 248/161, 188.5
See application file for complete search history.

(56) References Cited

U.S. PATENT DOCUMENTS

| 4,226,286 A * | 10/1980 | Cramer | E21B 33/00 166/85.2 |
| 4,941,245 A * | 7/1990 | Yamashita | B23D 71/005 279/128 |
| 5,590,863 A * | 1/1997 | Sasaki | E04G 17/14 248/354.3 |
| 5,758,854 A * | 6/1998 | Shih | E04G 25/06 248/354.3 |

(Continued)

FOREIGN PATENT DOCUMENTS

| GB | 825126 A * 12/1959 | ............. E04G 25/06 |

*Primary Examiner* — Amber R Anderson
*Assistant Examiner* — Nahid Amiri
(74) *Attorney, Agent, or Firm* — IP & T Group LLP (57) ABSTRACT

A multi-stiffener for civil engineering and construction includes an outer pipe member, an inner pipe member, an inner pipe position adjusting pin and a positioning member. The outer pipe member includes an outer pipe strut plate provided at one end of the outer pipe member, a pair of slot-shaped symmetrical guide holes extending in a longitudinal direction from a position spaced apart by a predetermined distance from an open end of the outer pipe member, and a height-adjustment-purpose external thread formed around the guide holes. The inner pipe member includes an inner pipe strut plate provided at one end of the inner pipe member and a plurality of symmetrical through-holes formed at specific intervals from the inner pipe strut plate. The inner pipe position adjusting pin is configured to penetrate the guide holes of the outer pipe member and the through-holes of the inner pipe member.

2 Claims, 6 Drawing Sheets

(56) References Cited

U.S. PATENT DOCUMENTS

| | | | | |
|---|---|---|---|---|
| 6,467,843 | B1 * | 10/2002 | Rossborough | A47C 3/34 108/150 |
| 6,746,183 | B1 * | 6/2004 | Sullivan | E04G 25/06 405/272 |
| 6,843,183 | B2 * | 1/2005 | Strong | A47B 9/14 108/147.19 |
| 7,584,932 | B2 * | 9/2009 | Shih | E04G 17/14 248/354.3 |
| 7,837,413 | B1 * | 11/2010 | Kundel, Sr. | E02D 17/083 248/354.4 |
| 8,066,247 | B2 * | 11/2011 | Spera | E04G 11/38 248/354.1 |
| 8,087,426 | B2 * | 1/2012 | Schuster | E03D 1/32 137/426 |
| 8,109,687 | B2 * | 2/2012 | Xu | F16B 7/105 108/147.21 |
| 8,616,519 | B2 * | 12/2013 | Bacon | E04G 11/483 249/18 |
| 9,132,993 | B1 * | 9/2015 | DiMartino | B66C 1/12 |
| 2005/0161571 | A1 * | 7/2005 | Wood | E04G 25/061 248/354.3 |
| 2006/0186284 | A1 * | 8/2006 | Root | F16B 7/1472 248/161 |
| 2008/0035806 | A1 * | 2/2008 | Sporay | B63B 49/00 248/161 |
| 2015/0292676 | A1 * | 10/2015 | Hsiung | F17C 1/00 206/0.6 |

* cited by examiner

MULTI-STIFFENER FOR CIVIL ENGINEERING AND CONSTRUCTION

TECHNICAL FIELD

The present invention relates to a multi-stiffener for civil engineering and construction capable of securing the strength of a wale as a walling temporary installation member and, more particularly, to a multi-stiffener for civil engineering and construction which is installed in a removable manner instead of welding so that the stiffener can be installed and removed with ease to reuse the same and the length of the stiffener can be adjusted with ease.

BACKGROUND ART

In general, at the time of a civil engineering and construction work, the ground is first excavated and a walling temporary facility is installed in order to prevent the collapse of the ground. Thereafter, construction is carried out.

The walling temporary facility is installed using a spread beam method or a ground anchor method. An H-beam type wale is perpendicularly installed inside a horizontal spread beam to support the spread beam.

However, in the walling temporary facility having the aforementioned structure, loads are concentrated on the horizontally-installed wale. Thus, if a local buckling phenomenon occurs in the wale, a ground sinking or collapse accident may be generated.

Specifically, when a shear stress is excessively generated in the wale, buckling occurs in the wale. This leads to deformation and shear failure of the wale.

As a result, an eccentric load acts on the horizontally-installed spread beam. Thus, there may be generated an accident in which a screw jack is destroyed and a walling temporary facility is collapsed.

In order to solve the above problem, wale-reinforcing stiffeners are installed in the wale of the walling temporary facility at predetermined intervals in order to prevent local buckling caused by a shear force and to secure strength.

In the case of the aforementioned wale-reinforcing stiffeners, typically, a steel plate is processed in conformity with the standard of a wale having an H-beam shape and is welded between the flanges of wales by fillet welding.

This poses a problem in that a great deal of time is consumed in installing the wale-reinforcing stiffeners.

For the aforementioned reason, in a construction site, there may be a case where a wale-reinforcing stiffener is not installed at all or a case where a stiffener is installed only in the upper portion of a wale that can be visually checked.

Thus, there is a problem in that the deformation and collapse of the walling temporary facility, the sinking of the rear surface portion and the like occur.

Furthermore, according to the conventional method in which the reinforcing stiffener is attached to the wale by welding, the stiffener cannot be reused and is therefore uneconomical. After the stiffener is installed, it is difficult to change the position of the stiffener. In addition, there is a problem in that the labor cost is increased due to the fillet welding work.

Moreover, the steel plate needs to be separately processed in conformity with the size of the wale. The lower portion of the wale has to be subjected to upward welding. This leads to a problem of reduced installation quality.

In addition, at the time of the welding work of the stiffener, there may be generated an accident in which a worker falls down or undergoes electrical shock. There is also a possibility of explosion. If a worker performs works for a long time in an unstable posture, a problem is posed in that the worker may suffer from a muscular skeletal disease.

In order to solve the problems of the weld type stiffener, various non-weld type stiffeners have been developed and used.

According to the non-weld type stiffeners, it is possible to solve the problems inherent in the weld type stiffener described above.

However, the conventional non-weld type stiffeners have a problem in that it is difficult or impossible to adjust the length thereof, which makes it impossible to generally use the non-weld type stiffeners.

In addition, some of the conventional non-weld type stiffeners cannot be installed or are difficult to install in a specific section. It is also inconvenient to adjust the length thereof using a spanner.

SUMMARY OF THE INVENTION

In view of the aforementioned problems inherent in the related art, it is an object of the present invention to provide a multi-stiffener for civil engineering and construction which is a non-weld type stiffener used for reinforcing a wale and which can be installed and removed with ease and can be reused.

Another object of the present invention is to provide a multi-stiffener for civil engineering and construction which makes it possible to adjust the length with ease and which can shorten the work time required for installing the stiffener.

According to one embodiment of the present invention, there is provided a multi-stiffener for civil engineering and construction, including: an outer pipe member formed in a pipe shape, the outer pipe member including an outer pipe strut plate provided at one end of the outer pipe member, a pair of slot-shaped symmetrical guide holes extending in a longitudinal direction from a position spaced apart by a predetermined distance from an open end of the outer pipe member, and a height-adjustment-purpose external thread formed around the guide holes; an inner pipe member formed in a pipe shape, the inner pipe member including an inner pipe strut plate provided at one end of the inner pipe member and a plurality of symmetrical through-holes formed at specific intervals from the inner pipe strut plate, the inner pipe member inserted into the outer pipe member so as to move in the longitudinal direction; an inner pipe position adjusting pin configured to penetrate the guide holes of the outer pipe member and the through-holes of the inner pipe member; and a positioning member including an internal thread formed on an inner surface of the positioning member and coupled to the height-adjustment-purpose external thread of the outer pipe member, the positioning member fitted to an outer surface of the outer pipe member and configured to change a position of the inner pipe position adjusting pin through rotational movement.

In the multi-stiffener, the positioning member may include a direction indication portion formed on an outer surface of the positioning member to indicate a rotation direction and a movement direction of the positioning member, and a plurality of projections formed to protrude from an outer periphery of the positioning member.

In the multi-stiffener, a pair of storage-purpose through-holes may be formed in the outer pipe member at a position spaced apart by a predetermined distance from the outer pipe strut plate of the outer pipe member, and a pair of storage-purpose through-holes may be formed in the inner pipe member at a position spaced apart by a predetermined distance from an open end of the inner pipe member.

In the multi-stiffener, permanent magnets may be mounted at four corners of each of the outer pipe strut plate and the inner pipe strut plate.

In the multi-stiffener, a position indication portion indicating positions of the through-holes of the inner pipe member may be formed around the through-holes of the inner pipe member.

In the multi-stiffener, the inner pipe position adjusting pin may be provided at one end with a head portion having a larger diameter than the guide holes of the outer pipe member and at the outer end with an elastic projection for preventing removal of the inner pipe position adjusting pin.

In the multi-stiffener, a connection link may be connected to the head portion of the inner pipe position adjusting pin, and a ring to be fitted to an outer periphery of the inner pipe member may be connected to a free end of the connection link.

In the multi-stiffener, protrusions extending in the longitudinal direction may be symmetrically formed on an inner surface of the outer pipe member, and recesses corresponding to the protrusions may be formed on an outer surface of the inner pipe member.

The multi-stiffener for civil engineering and construction according to the present invention has an effect that as compared with the conventional weld type stiffeners, the economic feasibility and the ease of installation are improved.

Furthermore, the present multi-stiffener is reusable and is easy to install. Thus, it is possible to guide the installation of the stiffener. The present multi-stiffener is convenient to use because the length thereof can be adjusted with ease.

Furthermore, the present multi-stiffener can be installed without having to perform a welding work and a cutting work. Thus, there is no possibility of explosion and electrical shock. Since there is no need to employ a skilled welding worker, it is possible to save labor costs.

Furthermore, as compared with the conventional weld type stiffeners, it is possible for the present multi-stiffener to shorten the work time and to reduce the occurrence of safety accidents.

Furthermore, the movement direction of the present multi-stiffener corresponding to the rotation direction of the positioning member is indicated on the direction indication portion. It is therefore possible to reduce a human error when adjusting the length.

In addition, there is provided an effect that it is possible to avoid the damage and loss of the pin of the present multi-stiffener.

MODE FOR CARRYING OUT THE INVENTION

A preferred embodiment of the present invention will now be described in detail with reference to the accompanying drawings.

Figure 1:
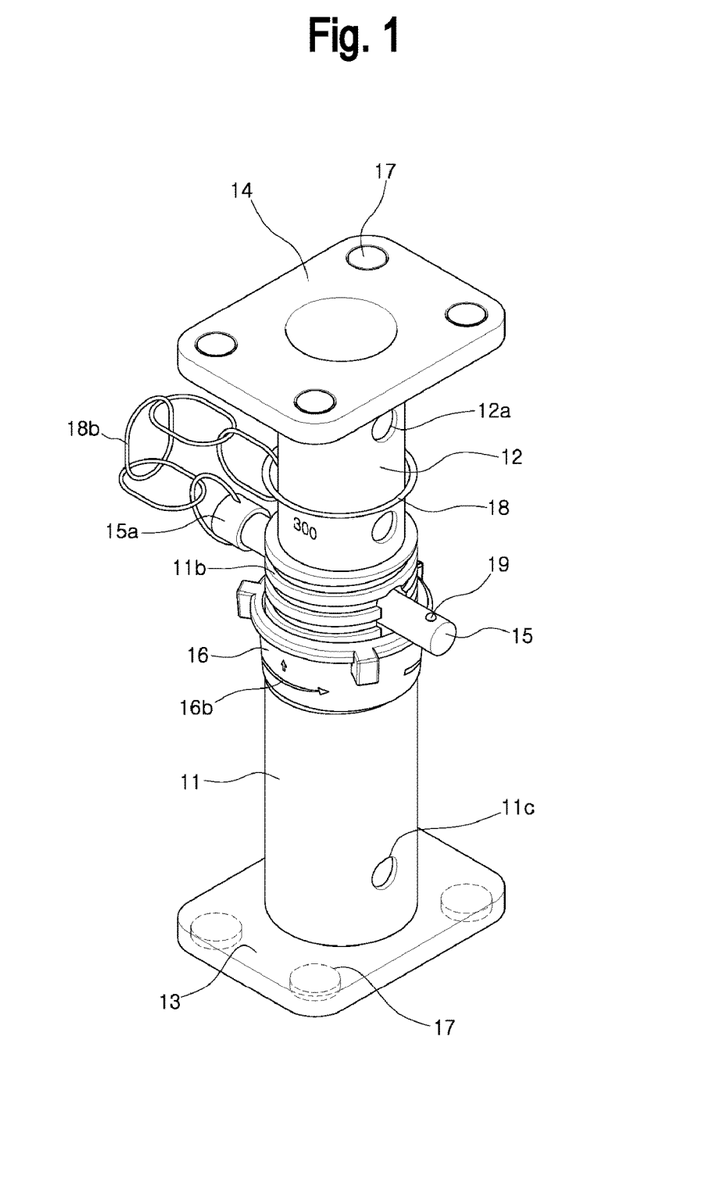
FIG. 1 is a perspective view showing a multi-stiffener for civil engineering and construction according to the present invention.
Figure 2:
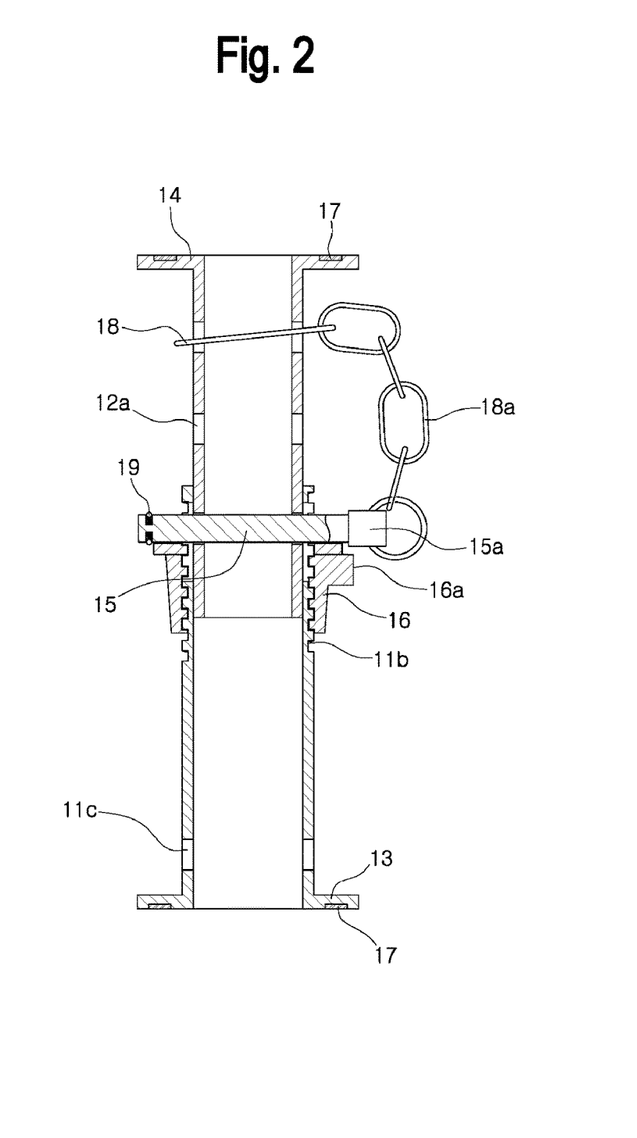
FIG. 2 is a sectional view of the multi-stiffener for civil engineering and construction according to the present invention.
Figure 3:
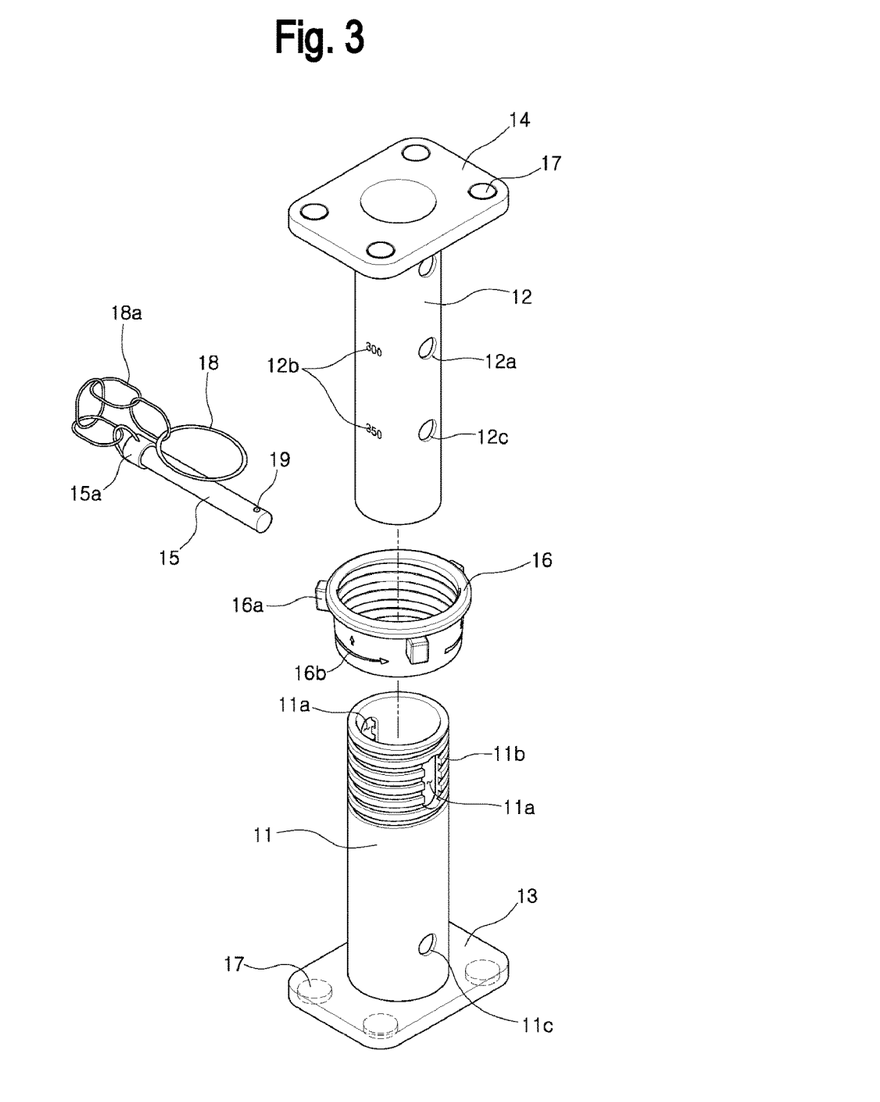
FIG. 3 is an exploded perspective view of the multi-stiffener for civil engineering and construction according to the present invention.

Referring to FIGS. 1 to 3, the multi-stiffener for civil engineering and construction according to the present invention includes: an outer pipe member 11 formed in a pipe shape, the outer pipe member 11 including an outer pipe strut plate 13 provided at one end of the outer pipe member 11, a pair of slot-shaped symmetrical guide holes 11a extending in a longitudinal direction from a position spaced apart by a predetermined distance from an open end of the outer pipe member 11, and a height-adjustment-purpose external thread 11b formed around the guide holes 11a; an inner pipe member 12 formed in a pipe shape, the inner pipe member 12 including an inner pipe strut plate 14 provided at one end of the inner pipe member 12 and a plurality of symmetrical through-holes 12a formed at specific intervals from the inner pipe strut plate 14, the inner pipe member 12 inserted into the outer pipe member 11 so as to move in the longitudinal direction; an inner pipe position adjusting pin 15 configured to penetrate the guide holes 11a of the outer pipe member 11 and the through-holes 12a of the inner pipe member 12; and a positioning member 16 including an internal thread formed on an inner surface of the positioning member and coupled to the height-adjustment-purpose external thread 11b of the outer pipe member 11, the positioning member 16 fitted to an outer surface of the outer pipe member 11 and configured to change a position of the inner pipe position adjusting pin 15 through rotational movement.

In this regard, the outer pipe member 11 and the inner pipe member 12 are manufactured from a hollow steel pipe. The length thereof may be preferably 20 cm.

When the inner pipe member 12 is completely inserted into the outer pipe member 11, the minimum length of the multi-stiffener may be preferably 21 cm. The maximum length of the multi-stiffener in a state in which the minimum insertion length of the inner pipe member 12 equal to 5 cm is secured may be preferably 35 cm.

This is in view of the standard of an H-beam wale having a dimension of 250×250×9×14, 300×200×9×14, 300×300×10×15, 300×305×15×15 or 350×350×12×19 most frequently used in a construction site.

However, the size of the multi-stiffener is not limited thereto. When the multi-stiffener is applied to a wale having a special dimension, the inner pipe member 12 and the outer pipe member 11 may be separately manufactured and used.

The thickness of the inner pipe member 12 may be preferably in a range of 2.2 to 2.6 mm and the thickness of the outer pipe member 11 may be 2.0 mm. The thickness of the inner pipe strut plate 14 and the outer pipe strut plate 13 may be preferably 5.0 mm. In addition, the diameter of the inner pipe position adjusting pin 15 may be preferably 17 mm or more.

Figure 4:
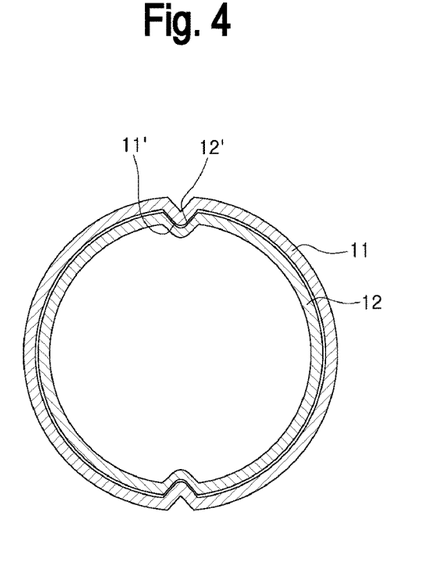
FIG. 4 is a sectional view of an inner pipe member and an outer pipe member of the multi-stiffener for civil engineering and construction according to the present invention.
Figure 5:
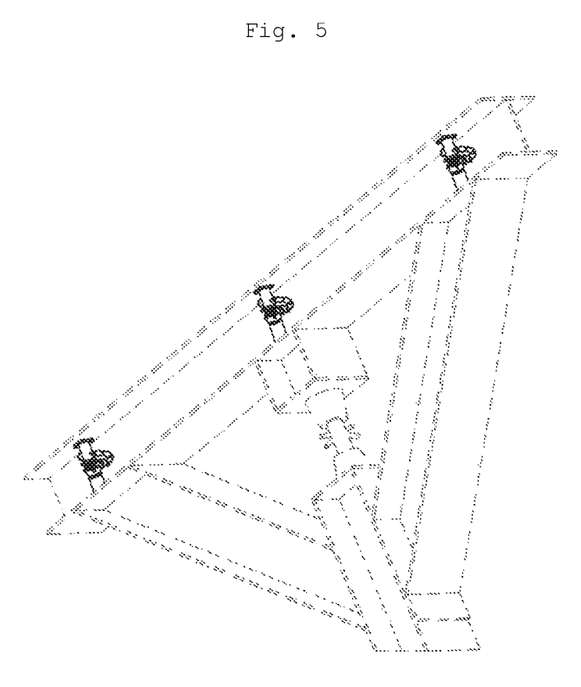
FIGS. 5 and 6 are state-of-use views of the multi-stiffener for civil engineering and construction according to the present invention.
Figure 6:
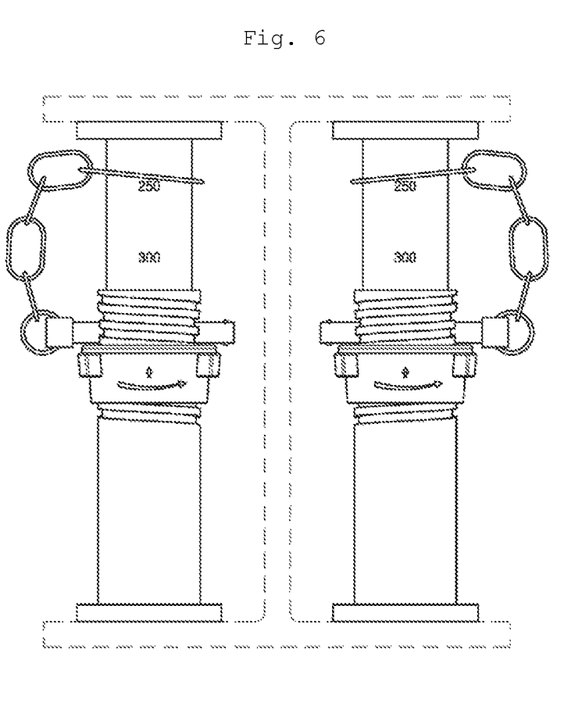

AS shown in FIG. 4, protrusions 11' extending in the longitudinal direction may be symmetrically formed on an inner surface of the outer pipe member 11, and recesses 12' corresponding to the protrusions 11' may be formed on an outer surface of the inner pipe member 12.

The protrusions 11' and the recesses 12' are formed to align the guide holes 11a of the outer pipe member 11 with the through-holes 12a of the inner pipe member 12, to prevent rotation of the inner pipe member 12 inside the outer pipe member 11 and to allow movement of the inner pipe member 12 in the longitudinal direction.

The positioning member 16 may include a plurality of projections 16a protruding radially outward so that a user can grip the projections 16a and rotate the positioning member 16.

A direction indication portion 16b indicating the movement direction corresponding to the rotation direction may be formed on an outer surface of the positioning member so that a user can easily recognize the movement direction of the positioning member 16.

A pair of storage-purpose through-holes 11c may be formed in the outer pipe member 11 at a position spaced apart by a predetermined distance from the outer pipe strut plate 13 of the outer pipe member 11. A pair of storage-purpose through-holes 12c may be formed in the inner pipe member 12 at a position spaced apart by a predetermined distance from an open end of the inner pipe member 12.

The storage-purpose through-holes 11c and the storage-purpose through-holes 12c are formed in order to minimize the length of the multi-stiffener when not in use. That is to say, the overall length of the multi-stiffener can be minimized by completely inserting the inner pipe member 12 into the outer pipe member 11 and then inserting the inner pipe position adjusting pin 15 into the storage-purpose through-holes 11c and 12c so as to fix the inner pipe member 12 against movement.

Permanent magnets 17 are mounted at four corners of each of the outer pipe strut plate 13 and the inner pipe strut plate 14. The permanent magnets 17 mounted to the outer pipe strut plate 13 and the inner pipe strut plate 14 make it possible to easily install the multi-stiffener in the wale.

However, the present invention is not limited thereto. A plurality of through-holes may be formed in the outer pipe strut plate 13 and the inner pipe strut plate 14. The multi-stiffener may be fixed to the wale using a bolt and a nut. Permanent magnets, a bolt and a nut may be used in combination.

A position indication portion 12b indicating the position of the through-holes 12a may be formed around the through-holes 12a of the inner pipe member 12. The position indication portion 12b numerically indicates the distance between the outer pipe strut plate 13 and the inner pipe strut plate 14 in a state in which the inner pipe position adjusting pin 15 is inserted into the through-holes 12a.

Using the position indication portion 12b, it is possible to select the through-holes at a suitable position depending on the distance between the flanges of the wale. This makes it possible to reduce the operation time of the positioning member 16.

As shown in FIG. 3, the inner pipe position adjusting pin 15 is provided at one end with a head portion 15a having a larger diameter than the guide holes 11a of the outer pipe member 11 and at the outer end with an elastic projection 19 for preventing removal of the inner pipe position adjusting pin 15.

The elastic projection 19 is provided with an elastic means such as a spring or the like. The elastic projection 19 allows the inner pipe position adjusting pin 15 to be inserted into the through-holes 12a of the inner pipe member 12 and prevents removal of the inner pipe position adjusting pin 15 after the inner pipe position adjusting pin 15 passes through the guide holes 11a of the outer pipe member 11.

Furthermore, a connection link 18a may be connected to the head portion 15a of the inner pipe position adjusting pin 15. A ring 18 to be fitted to the outer periphery of the inner pipe member 12 may be connected to the free end of the connection link 18a.

The aforementioned structure of the inner pipe position adjusting pin 15 helps prevent the loss of the inner pipe position adjusting pin 15.

Hereinafter, the operations and effects of the multi-stiffener for civil engineering and construction according to the present invention will be described.

First, the length indicated on the position indication portion of the inner pipe member is checked according to the standard of the wale. The through-holes of the inner pipe member into which the inner pipe position adjusting pin is to be inserted are selected.

Then, the inner pipe position adjusting pin is inserted into one of the guide holes of the outer pipe member. Thereafter, the inner pipe position adjusting pin is caused to pass through the selected through-holes of the inner pipe member and protrude from the other guide hole of the outer pipe member.

After the primary length adjustment of the multi-stiffener is completed through the aforementioned process, the multi-stiffener is installed between the flanges of the wale.

At this time, the outer pipe strut plate is fixed to one of the flanges of the wale using bolts or permanent magnets. Then, the inner pipe member is finely moved in the longitudinal direction by rotating the positioning member.

After the inner pipe strut plate of the inner pipe member is brought into close contact with one of the flanges of the wale, the projections of the positioning member are struck by a hammer to prevent unwanted removal of the multi-stiffener, thereby completing installation of the multi-stiffener.

The removal of the multi-stiffener may be performed in an order opposite to the order of installation described above.

According to the present invention, the stiffener is installed in a removable manner instead of welding. Thus, the stiffener can be easily installed and removed. It is also possible to reuse the stiffener. In addition, the length of the stiffener can be conveniently adjusted in conformity with the standard of the wale.

While a preferred embodiment of the present invention has been described above, the present invention is not limited to this embodiment. It is to be understood that various changes and modifications may be made without departing from the scope of the invention defined in the claims.

What is claimed is:

1. A multi-stiffener for installation between flanges of an H-beam wale, the multi-stiffener, comprising:
   an outer pipe member formed in a pipe shape, the outer pipe member including an outer pipe strut plate provided at one end of the outer pipe member to engage the H-beam wale, a pair of slot-shaped symmetrical guide holes extending in a longitudinal direction from a position spaced apart by a predetermined distance from an open end of the outer pipe member, and a height-adjustment-purpose external thread formed around the guide holes;
   an inner pipe member formed in a pipe shape, the inner pipe member including an inner pipe strut plate provided at one end of the inner pipe member to engage the H-beam wale and a plurality of symmetrical through-holes formed at specific intervals from the inner pipe strut plate that are identified by corresponding position indication portions formed on the inner pipe member, the inner pipe member inserted into the outer pipe member so as to move in the longitudinal direction;

an inner pipe position adjusting pin configured to penetrate the guide holes of the outer pipe member and the through-holes of the inner pipe member; and a positioning member including an internal thread formed on an inner surface of the positioning member and coupled to the height-adjustment-purpose external thread of the outer pipe member, the positioning member fitted to an outer surface of the outer pipe member and configured to change a position of the inner pipe position adjusting pin through rotational and longitudinal movement in directions indicated by a direction indication portion formed on an outer surface of the positioning member, the rotational and longitudinal movement facilitated by a plurality of projections formed to protrude from an outer periphery of the positioning member; and a plurality of magnets formed on the inner pipe strut plate and the outer pipe strut plate to magnetically engage surfaces of the H-beam wale to retain the multi-stiffener in position with respect to the H-beam wale during installation of the multi-stiffener, wherein a pair of storage-purpose through-holes is formed in the outer pipe member at a position spaced apart by a predetermined distance from the outer pipe strut plate of the outer pipe member, and a pair of storage-purpose through-holes is formed in the inner pipe member at a position spaced apart by a predetermined distance from an open end of the inner pipe member, wherein the inner pipe position adjusting pin is provided at one end with a head portion having a larger diameter than the guide holes of the outer pipe member and at the outer end with an elastic projection for preventing removal of the inner pipe position adjusting pin, and wherein a connection link is connected to the head portion of the inner pipe position adjusting pin, and a ring to be fitted to an outer periphery of the inner pipe member is connected to a free end of the connection link.

2. The multi-stiffener of claim 1, wherein protrusions extending in the longitudinal direction are symmetrically formed on an inner surface of the outer pipe member, and recesses corresponding to the protrusions are formed on an outer surface of the inner pipe member.

* * * * *